United States Patent [19]

Cytra

[11] Patent Number: 4,462,740
[45] Date of Patent: Jul. 31, 1984

[54] ROTARY CHARGER

[75] Inventor: Viktor Cytra, Delta, Canada

[73] Assignee: Luaaron Metals Ltd., Vancouver, Canada

[21] Appl. No.: 299,367

[22] Filed: Sep. 4, 1981

[51] Int. Cl.³ ............................................. C10J 3/30
[52] U.S. Cl. .................................. 414/220; 222/218; 222/368
[58] Field of Search ............. 414/189, 219, 220; 222/218, 219, 368; 48/86 R

[56] References Cited

U.S. PATENT DOCUMENTS

| | | | |
|---|---|---|---|
| 1,381,864 | 6/1921 | Evans et al. | 222/218 X |
| 2,684,186 | 7/1954 | Mattos | 222/368 X |
| 2,858,212 | 10/1958 | Durant et al. | 414/220 |
| 2,921,721 | 1/1960 | Brooks | 222/368 |
| 2,933,208 | 4/1960 | Green | 414/220 |
| 3,610,476 | 10/1971 | Starrett | 414/220 |
| 3,612,307 | 10/1971 | Vogt | 414/220 |
| 3,884,397 | 5/1975 | Andersson | 414/293 X |
| 3,994,418 | 11/1976 | Andersson | 222/216 X |
| 4,009,788 | 3/1977 | Waldhofer | 414/219 X |
| 4,025,317 | 5/1977 | Gencsoy | 48/86 R |
| 4,047,901 | 9/1977 | Baron et al. | 222/218 X |
| 4,078,704 | 3/1978 | Pinkel | 48/86 R X |

*Primary Examiner*—Leslie J. Paperner
*Attorney, Agent, or Firm*—Townsend and Townsend

[57] ABSTRACT

A material-feeding apparatus having a casing provided with inlet and outlet openings. The casing encloses a rotor provided with circumferentially-arranged cylinders each fitted with a free piston. The cylinders progressively register with the inlet opening which is at or near atmospheric pressure and the outlet opening which is exposed to high pressure as the rotor is rotated intermittently by a drive mechanism. The casing and rotor are provided with a network of conduits which interconnect selected cylinders as the motor moves through one complete revolution and balances the pressure between the two extremes existing within the inlet and outlet openings. Fluid pressure slightly in excess of the pressure present within the outlet opening is fed to each cylinder is register with that opening to move the piston and discharge the material from the apparatus.

5 Claims, 14 Drawing Figures

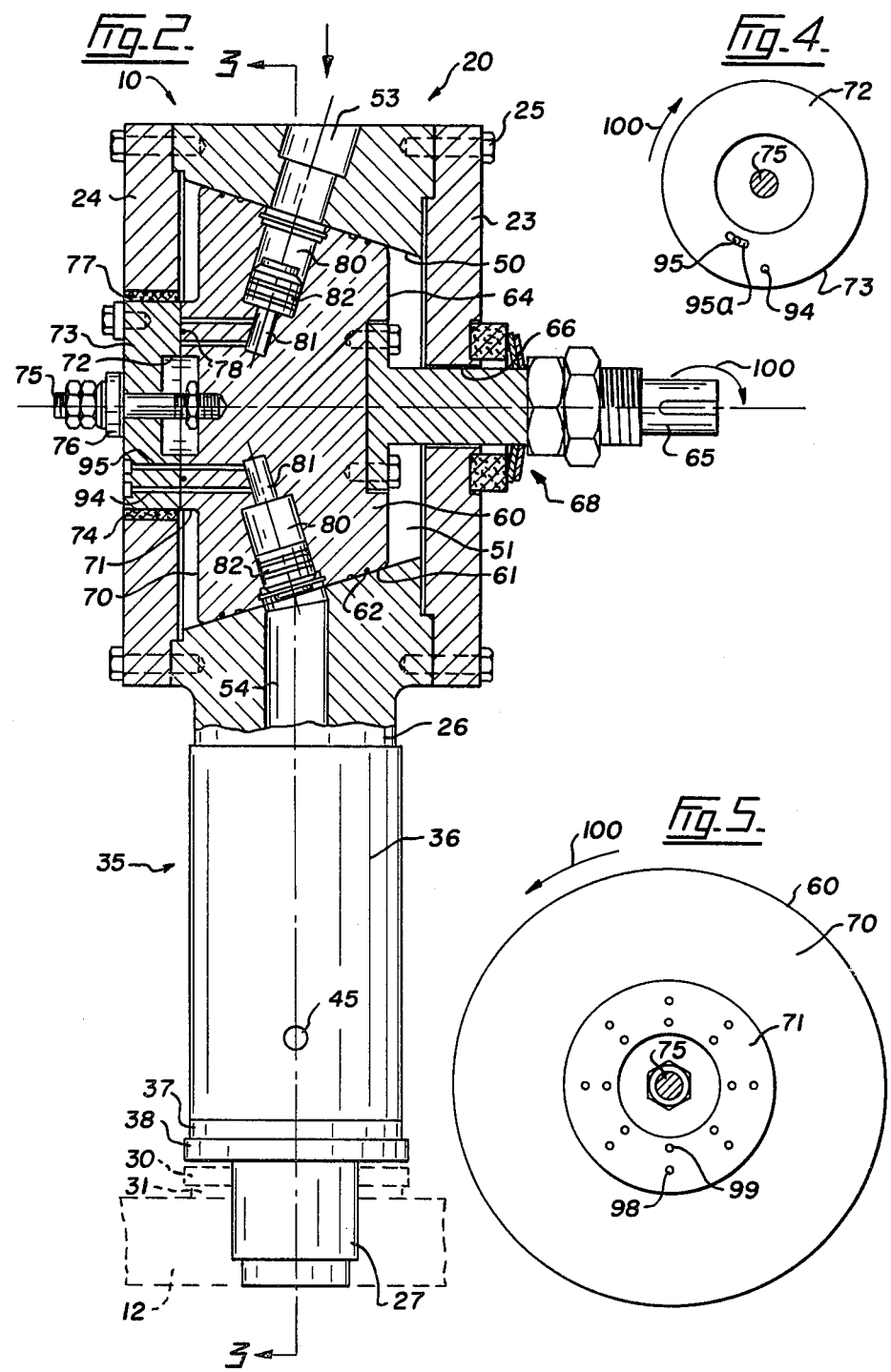

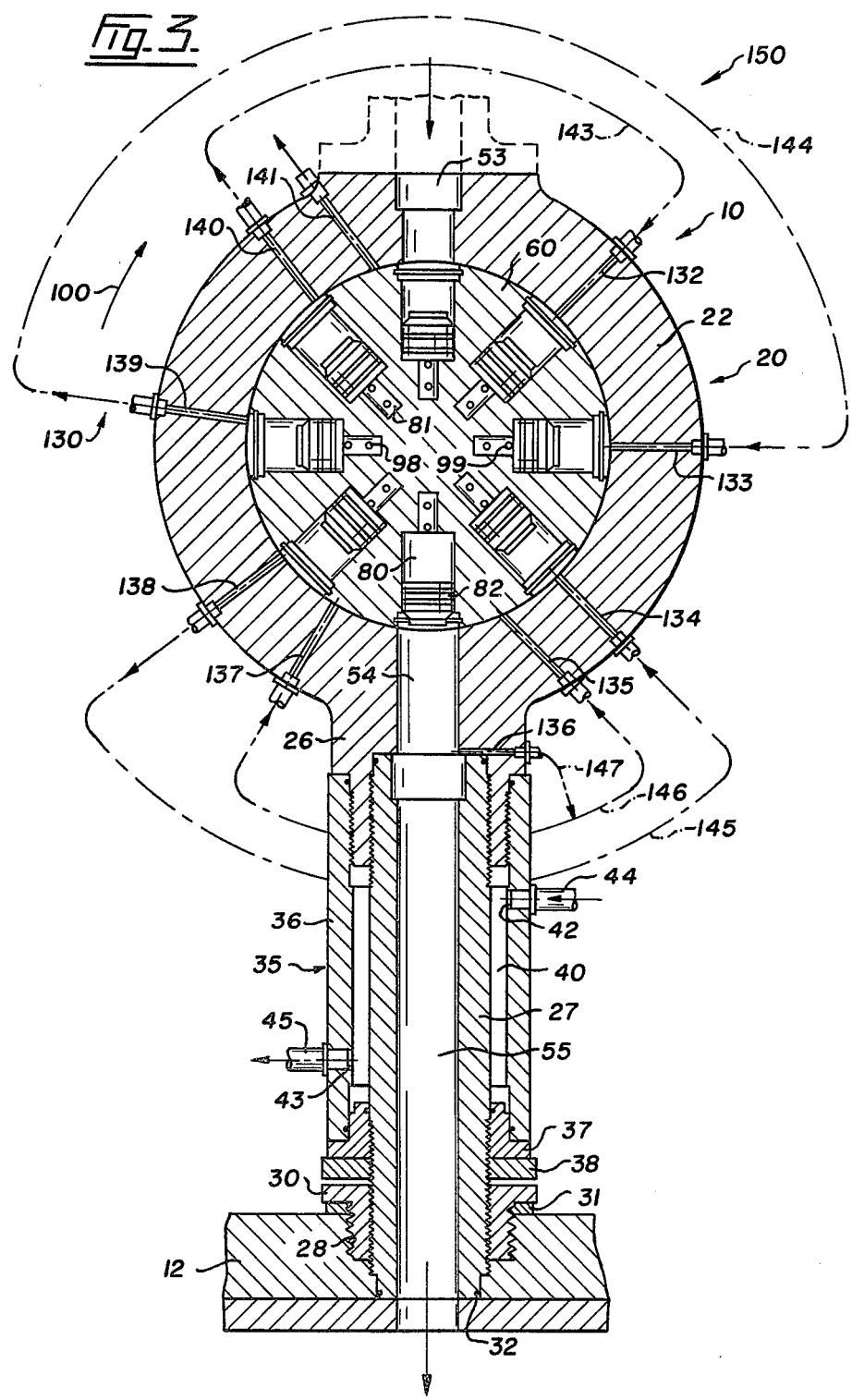

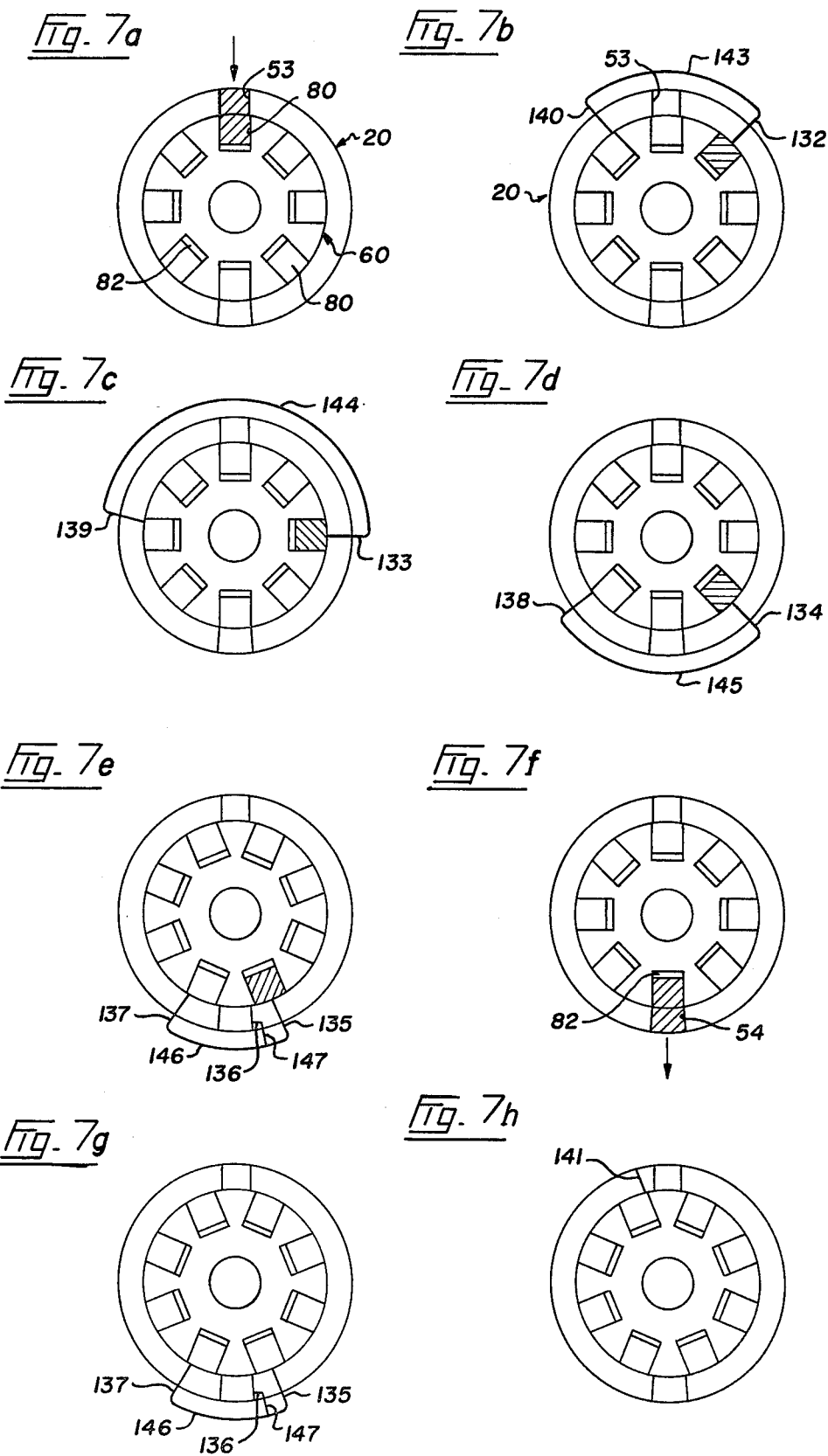

4,462,740

ROTARY CHARGER

BACKGROUND OF THE INVENTION

This invention relates to material-feeding devices and more particularly to a valve-like feeder for charging a pressurized vessel with comminuted material.

In the pulp industry, a variety of valves are used to provide input into pressurized vessels such as digesters and the like. These material-feeding valves are required to provide a pressure seal and this requirement has resulted in the use of feeder valves which do not always effectively transmit material and which require frequent maintenance contributing to loss of production. The problem inherent in the use of conventional valves as feeders for pressurized vessels is due in part to the unbalanced state in which they operate when required to seal feed openings into highly pressurized vessels. Also such feeders very often can only handle wet material in the form of a slurry which can be forceably pushed into the pressurized vessel. This introduces water into the process which turns to steam and increases the heat demand of the system. In addition, the presence of moisture in the system results in less precise control over the process generally and this further adds to the operating time and production costs.

SUMMARY OF THE INVENTION

The above as well as other disadvantages of conventional material-feeding valves are overcome by the present rotary charger which is designed to provide an effective seal for a pressurized vessel and still operate in a substantially balanced state. There is no necessity to form a slurry since the charger is capable of handling dry or fairly dry material which can be fed directly into a reactor operating at very high temperatures and pressures and where too much compaction of or air-entrainment with the material must be avoided as is the case in many systems such as one used to produce paraffin.

More specifically, apparatus according to the present invention may be defined as a rotary charger adapted to feed material into a vessel operating under high pressure which apparatus comprises a casing having an inlet opening and an outlet opening, a rotor mounted within the casing and having a plurality of cylinders opened to an outer surface of said rotor, a free piston in each cylinder, a drive mechanism for rotating the rotor intermittently to register the cylinders sequentially with the inlet and outlet openings, pressure equalizing means associated with the casing and connecting the cylinders to one another and to the interior of the vessel whereby as a charged cylinder is moved from the inlet to the outlet openings the pressure within that charged cylinder is progessively increased substantially from atmospheric to the operating pressure of the vessel, and fluid pressure means individually connecting each cylinder to an external source of fluid pressure whereby a charged cylinder is pressurized when in register with the inlet opening to a pressure exceeding the operating pressure of the vessel thereby extending the free piston of that cylinder to discharge the material therein into the outlet opening, said pressure equalizing means then serving to progressively decrease the pressure of the discharged cylinder substantially from the operating pressure of the vessel to atmospheric as that cylinder moves from the outlet opening to the inlet opening.

BRIEF DESCRIPTION OF THE DRAWINGS

FIG. 2 is an enlarged elevation of the same side of the charger as appears in FIG. 1 with part of the device being shown in vertical section, FIG. 3 is a vertical section of the charger taken on the line 3—3 of FIG. 2, FIG. 4 is an elevation of a port block of the charger, FIG. 5 is an elevation of a rotor of the charger, FIGS. 7a through 7h show the operating sequence of the rotary charger.

DESCRIPTION OF THE PREFERRED EMBODIMENTS

Figure 1:
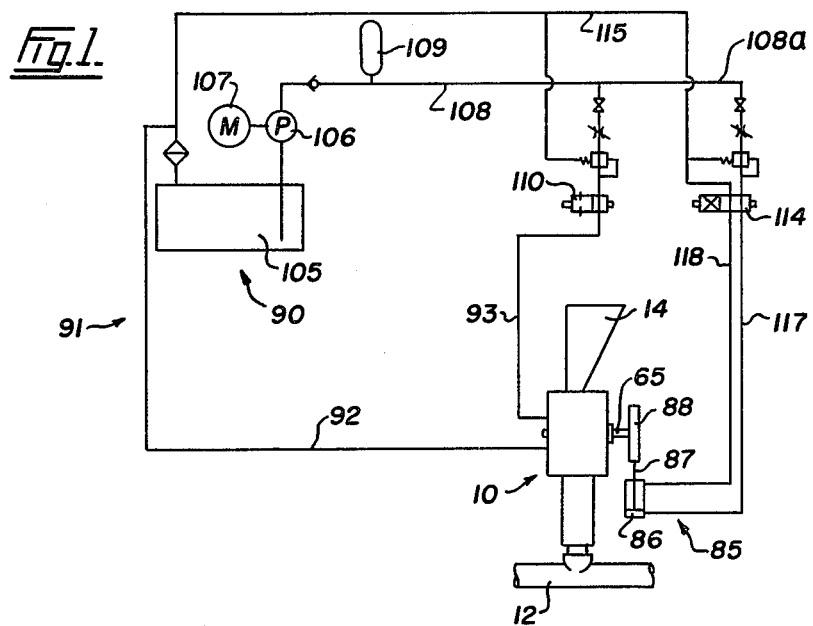
FIG. 1 is a side elevation of the present rotary charger and showing a hydraulic circuit associated therewith.

Referring to the drawings, the numeral 10 indicates generally a rotary charger constructed in accordance with the present invention. The charger 10 is shown in FIG. 1 in a typical position of use mounted on a reactor 12 which forms part of the system used to produce paraffin oil from wood chips or waste paper, or other comminuted material containing cellulose. The oil-producing material is received by the charger from a hopper 14 and the charger feeds that material which contains little or no moisture into the reactor where the material is subjected to intense heat and pressure during the process which extracts the oil. The pressure within the reactor can be as high as 3500 p.s.i. and the heat can reach a maximum of around 400° C. but the present charger is capable of operating effectively in the presence of this intense heat and pressure.

The rotary charger 10 is shown best in FIGS. 2 and 3 to be provided with a casing 20 having a substantially circular side wall 22 and end plates 23 and 24. Bolts 25 (FIG. 2) are used to clamp the end plates to the side wall of the casing 20. On the underside of the wall 22 there is an integrally-formed stem 26 which is threadedly connected to a pipe 27. The lower end of this pipe is threaded into an opening 28 formed in the top of the reactor 12. A lock nut 30 is used to secure the pipe to the reactor and suitable seals 31 and 32 are provided to prevent loss of reactor pressure at this point.

The rotary charger 10 might tend to overheat due to its attachment to the reactor 12 but this is prevented by the provision of cooling means as generally indicated at 35. As shown best in FIG. 3, the cooling means 35 comprises a cylindrical jacket 36 which is threadedly secured at the upper end thereof to the stem 26 of the casing. The lower end of this jacket is secured to the pipe 27 by a nut 37 and lock nut 38. An annular space 40 is thus provided between the pipe and the jacket. Inlet and outlet ports 42 and 43 are formed in the jacket 36, these ports being fitted with tubes 44 and 45 which are included in a suitable cooling system, not otherwise shown. Thus, water or other coolant is adapted to be circulated through the annular space 40 so as to prevent excess amounts of heat reaching the casing 20 from the reactor.

The peripheral end wall 22 of the casing has an inner face 50 which tapers inwardly from left to right as shown in FIG. 2. This tapered face of the end wall and the end plates 23 and 24 define a frusto-conical chamber 51 within the casing. On the upper arc of the wall 22 there is an inlet opening 53 for the oil-producing material, the longitudinal axis of this opening being perpendicular to the face 50 as shown in FIG. 2. Material from the hopper 14, for example, relatively dry wood chips having a maximum dimension of about ¼ inch, is adapted to travel as far as the chamber 51 through the inlet opening 53. An outlet opening 54 is formed in the side wall 22 below the material-receiving inlet opening 53 to connect the chamber 51 with a bore 55 of the vertically standing pipe 27. It will be noted in FIG. 2 that the major portion of the material-discharging opening 54 is vertically aligned with the corresponding axis of the pipe and that only a relatively smaller portion of the opening is perpendicular to the chamber 51.

Comminuted material is transferred from the opening 53 to the opening 54 by means of a rotor 60 and associated parts. This rotor 60 is shown in FIG. 2 to be in the form of a truncated cone, the rotor having an outer face 61 which is fitted with sealing rings 62 having sliding engagement with the inner face 50 of the casing wall. One end face 64 of the rotor has bolted thereto a driven shaft 65 which projects outwardly through an opening 66 in the end plate 23. The shaft is supported on the casing plate 23 by a suitable bearing and sealing arrangement indicated generally at 68 in FIG. 2. On an opposite end face 70 of the rotor there is an annular flange 71 which is opposed by a similar flange 72 formed on a circular port block 73, the block being located in a relatively large opening 74 formed in the end plate 24. A bolt 75 secures the circular block 73 to the rotor and this bolt is fitted with a thrust bearing 76 which allows the block to remain stationary while the rotor rotates. The opening 74 is fitted with a suitable seal 77 and the opposing faces of the flanges 71 and 72 are sealed by a ring 78.

The rotor 60 is provided with a plurality of radially disposed cylinders 80 which are opened to the outer face 61. These cylinders are sealed from the rest of the chamber 51 by the rings 62. In the present rotary charger, there are eight such cylinders with a longitudinal axes of the cylinders being perpendicular to the rotor face 61 as shown best in FIG. 2. The rotor is drilled to provide each cylinder with an axially aligned recess 81. Slidably mounted in each cylinder is a free piston 82, that is, the piston normally is free to reciprocate in the cylinder since it does not have other parts connected thereto.

The rotor 60 is adapted to be rotated intermittently so as to place each cylinder 80 in turn in register first with the inlet opening 53 and 180° later in register with the outlet opening 54. For this purpose, the rotary charger 10 is provided with a drive mechanism which is generally indicated at 85 as shown diagrammatically in FIG. 1 only. The mechanism 85 comprises a hydraulic cylinder 86 which is included in a circuit which will be referred to later. This cylinder has a piston rod 87 which is operatively connected to an intermittent-movement device 88 mounted on the driven shaft 65 of the rotary charger. The arrangement is such that each time the cylinder 86 is pressurized to extend the rod 87, the device 88 is rotated a partial turn to impart the same movement to the drive shaft and the rotor 60. The rotor remains stationary, of course, when the cylinder 86 subsequently is pressurized to retract the piston rod.

The comminuted material consumed by the previously-mentioned system flows from the hopper 14 into the inlet opening 53. This feeding can be done by means of a driven feed worm or the material can simply be allowed to feed by gravity. As the rotor is rotated intermittently, each cylinder 80 in turn registers with the opening 53 and 54. The material falls by gravity into that cylinder which is below the inlet opening 53. The piston 82, of course, is at the bottom of the upper cylinder as the filling occurs. The rotor is rotated clockwise (FIG. 3) in stages and eventually each filled cylinder comes into register with the outlet opening 54. It is at this point that the piston of the bottom cylinder now in register with the outlet opening is moved downwardly or extended to eject material from the cylinder for delivery through the opening 54 and bore 55 of the pipe into the reactor 12.

The material-ejecting stroke of the pistons is accomplished by fluid pressure means generally indicated at 90. The means 90 comprises a hydraulic circuit 91, see FIG. 1. This circuit includes lines 92 and 93 which connect with inlet and outlet ports 94 and 95 respectively. (FIGS. 2 and 4) drilled through the port block 73. In FIG. 4, the disposition of the ports 94 and 95 on the side face of the flange 72 is illustrated and the outlet port will be seen to have a circumferentially-elongated exit portion 95a. The rotor 60 is drilled through the flange 71 to provide passageways 98 and 99 which at times, come into register with the inlet and outlet ports and these passageways extend into the rotor as far as the recesses 81. FIG. 5 shows the circumferential arrangement of the passageways 98 and 99 as they appear on the side face of the rotor flange 71.

It will be appreciated that the rotor 60 is driven intermittently in a clockwise direction as viewed in FIG. 3, that is, in the direction of the arrow 100 which also appears in FIGS. 2, 4 and 5. The ports 94 and 95 are swept by the passageways 98 and 99 as the rotor is moved intermittently, in other words, each passageway 98 momentarily comes into register with the inlet port 94 and subsequently each passageway 99 sweeps across the elongated exit portion 95a and pauses for a moment in full register with the outlet port 95. Thus, as the rotor is turned; oil delivered under pressure through the line 92, port 95 and passageway 98 into each cylinder 80 and the pressurized oil in that the cylinder is almost immediately relieved through the passageway 99, port 95 and line 93 when the rotor turns a further 22½° approximately.

Referring again to FIG. 1, the fluid pressure means 90 will also be seen to comprise a reservoir 105 from which oil is drawn by a pump 106 driven by a motor 107. A line 108 extends from the pump to an accumulator 109 thence to a control valve 110. This control valve is connected to the port 94 by the line 93 whereas the line 92 is a return line to the reservoir.

The drive mechanism 85 requires fluid pressure to operate and, preferably, the pressure is provided by an extension of the above-described circuit 91. In FIG. 1, the line 108 is shown to have a branch line 108a which extends to a control valve 114. A return line 115 connects this control valve to the reservoir 105. Lines 117 and 118 extend from the valve 114 to opposite ends of the cylinder 86 of the drive mechanism. Thus, the valve 114 is adapted to be operated so as to actuate the drive mechanism 85 and thereby move the rotor 60 intermittently. Operation of the valve 110 will pressurize the cylinders 80 as required to extend the pistons 82 and the charger will feed material into the reactor 12 provided the two control valves are operated in properly timed relation.

Figure 6:
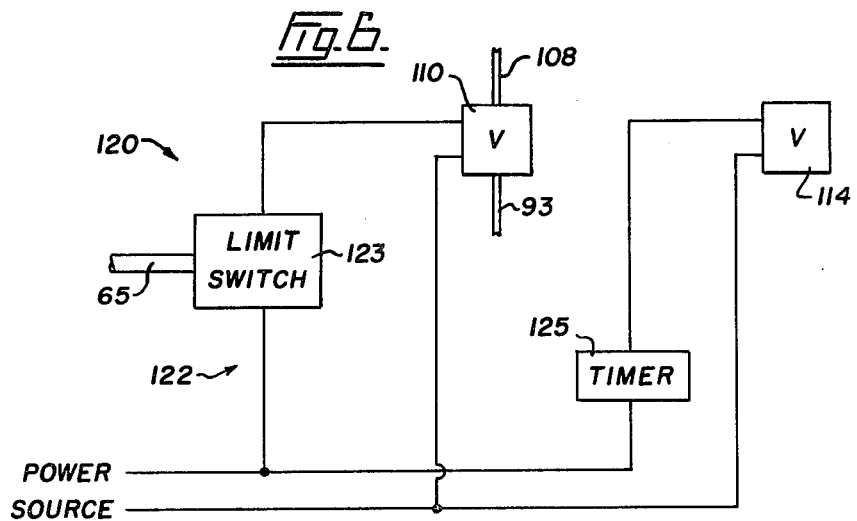
FIG. 6 is a wiring diagram showing means for timing the operation of the charger.

This provision is taken care of by timing means such as indicated generally at 120 in FIG. 6. The means 120 is shown to comprise an electric circuit 122 which connects the valves 110 and 114 to a source of power, not shown. Included in this electric circuit is a limit switch 123 which is operated by the driven shaft 65 of the rotary charger. The limit switch 123 is of conventional construction and the making and the breaking of its contacts can be adjusted so that the valve 110 opens and closes at proper intervals.

The timing means 120 also includes a suitable timer 125 which is adapted to be set so as to control the opening and closing movements of the valve 114. By suitably synchronizing the limit switch 123 and the timer 125, the rotary charger can be operated to feed the paraffin-producing material into the reactor 12 as will be described in detail later.

As previously mentioned, pressure within the reactor 12 can be around 3500 p.s.i. which means this pressure is present within the pipe bore 55 and the discharge opening 54 of the charger. The pressure within the inlet opening 53 on the other hand is substantially at atomspheric and the rotary charger is provided with means 130 for progressively varying the pressure within the cylinders as the rotor revolves whereby the pressure within each cylinder charged with material is built up from atmospheric to that of the operating pressure of the vessel and later is decreased in the same manner back to atmospheric.

The pressure equalizing means 130 is shown in FIG. 3 to comprise a number of ports designated as 132 to 141 and which are drilled through the wall 22 and the stem 26 of the casing. These ports are disposed in the paths of the cylinders 80 so as to connect therewith as a rotor 60 turns. The sports are circumferentially spaced apart for reasons which will be made apparent later. The port 141 connects the casing chamber 51 to atmosphere while the remaining ports are connected to one another by tubes indicated at 143 to 147 and which are shown in FIG. 3 partly by use of chain dotted lines. The several ports and tubes form a network which is shown best in FIG. 3 to be arranged as follows; tube 143 connects ports 132 and 140, tube 144 connects ports 133 and 139, tube 145 connects ports 134 and 138, and tubes 146 and 147 interconnect ports 135, 136 and 137.

The rotary charger 10 operates to feed dry material such as wood chips into the reactor 12 at a rate determined by the requirements of the paraffin-producing system. The combined operation of the drive mechanism 85 and the fluid pressure means 90 is co-ordinated by adjustment of the timing means 120 so that the feeding takes place at the required rate. This can be better understood by reference to FIG. 7 which illustrates schematically how the rotary charger 10 operates. Position A shows a cylinder 80 aligned with the intake opening 53 and therefor filled with wood chips which are represented by the cross hatching. The rotor 60 is moved clockwise 45° to the position shown at B and is halted there momentarily whereupon the filled cylinder and the adjacent trailing cylinder are placed in communication by the ports 132 and 140 and the tube 143. The trailing cylinder is pressurized at 875 p.s.i. as will be explained later and therefore the filled cylinder is subjected to the same pressure. When the filled cylinder moves to position C, the tube 144 and ports 133 and 139 connect it to the opposite cylinder and the common pressure within the cylinders is then 1750 p.s.i. At position D, the filled cylinder is connected by the tube 145 and ports 134 and 138 so that the common cylinder pressure becomes 2625 p.s.i.. The filled cylinder moves beyond the D position and in the E position sweeps into register with the port 135 so that the filled cylinder is connected by the tubes 146, 147 and the port 136 to the bore 55 and the pressure within the filled cylinder becomes 3500 p.s.i. or the same as the pressure of the reactor 12.

The filled cylinder then moves to position F at which time the passageway 98 is placed in register with the inlet port 94. Valve 110 is opened momentarily by the limit switch 123 and the oil which is pressurized by the means 90 to a pressure 50 lbs or so in excess of 3500 p.s.i. forces the piston 82 of the filled cylinder downwardly to eject the wood chips into the reactor through the discharge opening 54 and the bore 55. The just-emptied cylinder is moved to position G so that the passageway 99 registers with the outlet port 95 and the cylinder then is relieved of the pressurized oil. Interconnected ducts 146 and 147, ports 136 and 137, and bore 55 then place the interior of the reactor in communication with the relieved cylinder and the piston therein is forced by the pressure of the reactor back to its normal position at the bottom of the cylinder. The just-emptied cylinder moves on from position G to the position shown at D and the pressure within the two connected cylinders returns to 2625 p.s.i.. Next the position shown at C is arrived at and the pressure in the two connected cylinders drops to 1750 p.s.i. Next the piston as shown at B is reached and the common pressure in the two connected cylinders drops to 875 p.s.i. In position H, the cylinder which is just about to complete one cycle, or 360° of travel of the rotor, comes into register with the port 141 and the pressure in that cylinder is returned to atmospheric.

From the foregoing, it will be apparent the present charger is capable of feeding relatively dry material into the reactor and against the high operating pressure of the paraffin-producing system. The pressure within each cylinder is progressively built up step-by-step as the rotor moves 180° and is similarly reduced during travel through a subsequent 180°. As material is discharged by the positive displacement of the free piston in the cylinder opposite the outlet opening, that cylinder is exposed to the operating pressure of the vessel so that no unwanted air is introduced into the reactor with the solid material which could interfere with the operation of the system. Since the rotor is balanced as it rotates, due to the pressure equalizing means, the seal provided by the rotor and associated parts against the pressure within the retort is maintained and there is less wear and stress imposed on moving parts. The cooling means associated with the charger effectively blocks off the transfer of heat between the reactor and the charger.

I claim:

1. A rotary charger adapted to feed material into a vessel operating under pressure and comprising a casing having an inlet opening and an outlet opening, a rotor mounted within the casing and having a plurality of cylinders opened to an outer surface of said rotor, a free piston in each cylinder, a drive mechanism for rotating the rotor intermittently to register the cylinders sequentially with the inlet and outlet openings, pressure equalizing means associated with the casing and connecting the cylinders to one another and to the interior of the vessel whereby as a charged cylinder is moved from the inlet to the outlet openings the pressure within that charged cylinder is progressively increased substantially from atmospheric to the operating pressure of the vessel, said pressure equalizing means comprising a plurality of spaced first outlets in the casing arranged after the outlet opening and before the inlet opening as the rotor rotates;

a plurality of first spaced inlets arranged after the inlet opening and before the outlet opening as the rotor rotates;

said first outlets and first inlets arranged in pairs whereby a first outlet at a predetermined circumferential distance after the outlet opening communicates with a first inlet at about the same distance before the outlet opening to equalize the pressure in the cylinders of the pair;

a second outlet just circumferentially prior to the inlet opening to communicate with atmosphere a cylinder just prior to the inlet opening;

a second inlet on each side of the outlet opening;

a third outlet communicating the vessel pressure with said second inlets whereby the cylinder about to register with the outlet opening is at vessel pressure and the cylinder that has just registered with the outlet opening is at vessel pressure;

and fluid pressure means individually connecting each cylinder to an external source of fluid pressure whereby a charged cylinder is pressurized when in register with the outlet opening to a pressure exceeding the operating pressure of the vessel thereby extending the free piston of that cylinder to discharge the material therein into the outlet opening, said pressure equalizing means then serving to progressively decrease the pressure of the discharged cylinder substantially from the operating pressure of the vessel to atmospheric as that cylinder moves from the outlet opening to the inlet opening.

2. A rotary charger as claimed in claim 1, and including timing means for selectively adjusting the operations of the drive mechanism and the fluid pressure means.

3. A rotary charger as claimed in claim 1, and including cooling means for maintaining the temperature of the casing at an optimum level.

4. A rotary charger as claimed in claim 1 including pressure release means whereby the pressure in a cylinder necessary when the cylinder is in register with the outlet opening is dissipated as the cylinder is aligned with the second inlet circumferentially after the outlet opening, whereby pressure applied through the second inlet can push back the piston in the cylinder.

5. A rotary charger as claimed in claim 4 in which the pressure relief means comprises a passage extending to the exterior of the rotor;

means for aligning each cylinder in turn with said passage; and an opening in the casing to align briefly with the passage to allow pressure relief.

* * * * *